J. L. THOMSON.

SHOE CLASP.

No. 10,510. Reissued Aug. 12, 1884.

ATTEST-

Geo. C. Raymond Jr.

M. B. Ill.

INVENTOR-

Judson L. Thomson per Duell, Laass & Hey his Attys.

N. PETERS, Photo-Lithographer, Washington, D. C.

UNITED STATES PATENT OFFICE.

JUDSON L. THOMSON, OF SYRACUSE, NEW YORK.

SHOE-CLASP.

SPECIFICATION forming part of Reissued Letters Patent No. 10,510, dated August 12, 1884.

Original No. 272,101, dated February 13, 1883. Application for reissue filed July 2, 1884.

*To all whom it may concern:*

Be it known that I, JUDSON L. THOMSON, of Syracuse, in the county of Onondaga, in the State of New York, have invented new and useful Improvements in Shoe-Clasps, of which the following, taken in connection with the accompanying drawings, is a full, clear, and exact description.

This invention relates to that class of shoe-clasps in which a tongue, interlocking with a slotted plate, is held yieldingly in two of its operative positions by a spring bearing on a cam connected with the aforesaid tongue.

This invention consists in a novel mode of attaching the aforesaid spring to the plate on which the interlocking tongue is hinged, and also in other novel features of construction, as hereinafter described and specifically claimed.

The construction and combination of the constituent parts of my invention will be readily understood by reference to the annexed drawings, wherein—

Figure 1:
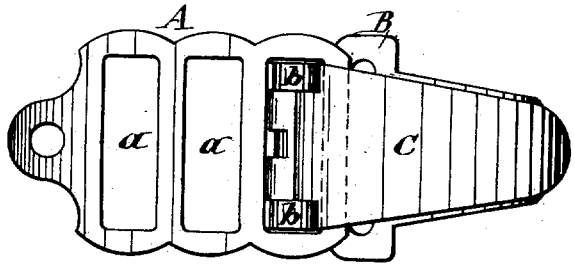
Figure 2:
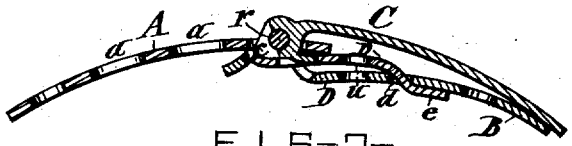
Figure 3:
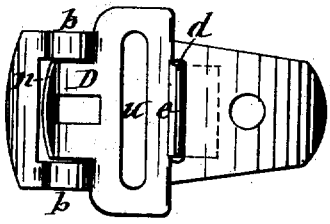
Figure 4:
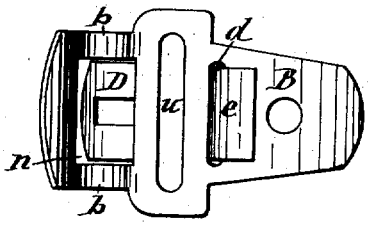
Figure 5:
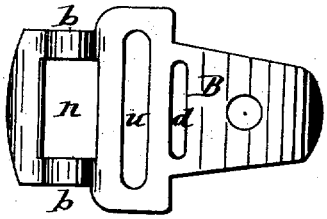
Figure 7:
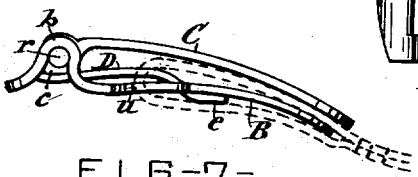
Figure 6:
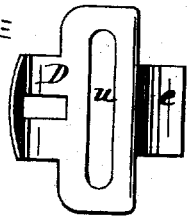

Figure 1 is a plan view of my improved shoe-clasp; Fig. 2, a longitudinal section of the same. Figs. 3 and 4 are detached top and bottom views, respectively, of the plate which carries the tongue, showing the attachment of the spring. Fig. 5 is a plan view of the aforesaid plate with the spring removed. Fig. 6 is a detached view of said spring; and Fig. 7 is an edge view of my improved shoe-clasp, illustrating its attachment to the flap or strap of the shoe.

Like letters of reference indicate like parts in all the figures.

A represents a metal plate, provided with two or more transverse slots, *a*, by which it is to interlock with another plate, B, in the manner hereinafter described, said plate A being adapted to be attached in any suitable manner to the usual flap on the front or side of an overshoe. B is another metal plate, adapted to be secured to the opposite flap of the overshoe. This plate is struck up from sheet metal, and formed with two semicircular concave bearings, *b b*, on the under side of its forward portion, in which bearings lies the pintle *r* of the tongue C, which is thus hinged on said plate, said tongue being provided at its hinged end with a cam or angular enlargement, *c*, for the purpose hereinafter explained. The plate B has on its forward portion, and directly under the cam *c* of the tongue C, an opening, *n*, and some distance back of said opening the aforesaid plate is provided with a transverse slot, *d*.

D denotes the spring in the form of a plate, lying over the plate B, and having its rear end, *e*, inserted in the slot *d* and its forward end extended into the opening *n*, said spring-plate being sprung over the intermediate solid portion of the plate B, and exerting an upward pressure on the cam *c* of the tongue, and thus serving to maintain the pintle of said tongue in the open semicircular bearings *b b*, and also to yieldingly hold the tongue in two of its operative positions—viz., down upon the plate B—for retaining the interlocked plate A, as shown in Figs. 1 and 2 of the drawings, and raised or thrown forward to release the plate A in unfastening the clasp.

It will be observed that the herein-described construction and combination of parts admit of easily stamping them out of sheet metal, and of readily uniting them to complete the article.

The central portion of both the plate B and spring-plate D, I prefer to provide with a transverse slot, *u*, so as to admit of fastening the said parts on the shoe by slipping the flap thereof through said slot and turning it back and fastening it on the fixed end thereof, as illustrated in Fig. 7 of the drawings. The slot *u* in the plate B is of great importance, as it affords a secure means of attachment, which is near the hinge of the tongue, and has its hold on a doubled flap inclosing in its fold the rear portion of said plate. Hence it is of equal importance to provide the spring-plate D with a suitable opening coinciding with the slot of the plate B sufficiently to allow the flap to pass through both plates and inclose in its fold the rear portion thereof, as aforesaid.

Having described my invention, what I claim as new, and desire to secure by Letters Patent, is—

1. In combination with the plate A, tongue C, provided with the cam *c* and pintle *r*, the plate B, provided with the pintle-bearings *b* and slot *d*, and the spring-plate D, lying over the plate B, and having its rear end, *e*, passing through the slot *d* and its free end extended under the cam *c*, substantially as shown and described.

2. In combination with the tongue C, the plate B, provided with a slot for the reception of the attaching-flap of the shoe, and the spring-plate D, connected to the rear portion of the plate B, and extended to the forward end thereof and under the tongue, and provided with an opening coinciding with the slot of plate B sufficiently to receive the aforesaid flap, substantially as and for the purpose shown and set forth.

JUDSON L. THOMSON.

Witnesses:
C. H. DUELL,
WM. C. RAYMOND.